United States Patent

[11] 3,534,841

[72] Inventors Gustav Schneider and Johann Dantele, Schweinfurt am Main, Germany
[21] Appl. No. 792,504
[22] Filed Jan. 21, 1969
[45] Patented Oct. 20, 1970
[73] Assignee Fichtel & Sachs AG Schweinfurt am Main, Germany
[32] Priority Jan. 27, 1968
[33] Germany
[31] No. 1,680,049

[54] CLUTCH DISC WITH DAMPERS IN SERIES
10 Claims, 4 Drawing Figs.
[52] U.S. Cl. ................................................. 192/106.2, 64/15
[51] Int. Cl. ........................................................ F16d 13/60
[50] Field of Search ....................................... 192/55, 106.2, 107(CP)

[56] References Cited
UNITED STATES PATENTS
| | | | |
|---|---|---|---|
| 3,101,600 | 8/1963 | Stromberg .................... | 192/106.2 |
| 3,414,101 | 12/1968 | Binder et al. ................. | 192/106.2 |

*Primary Examiner*—Benjamin W. Wyche, III
*Attorney*—Low and Berman

ABSTRACT: A clutch disc assembly in which a secondary hub is radially interposed between the principal hub and the disc element carrying friction facings. Vibration absorbing elements impede relative angular displacement of the disc element and of the secondary hub, and of the two hubs relative to each other. The last-mentioned vibration absorbing element includes a disc member fixed on the principal hub and axially flanked by two loose disc members whose outer peripheries are secured against rotation relative to the secondary hub member.

3,534,841

CLUTCH DISC WITH DAMPERS IN SERIES

This invention relates to clutch disc assemblies, and particularly to an improved driven member for a friction clutch of the automotive type.

More specifically, this invention is concerned with an improvement in the driven member disclosed in the commonly owned U.S. Pat. No. 3,414,101. While the clutch disc disclosed in the patent functions well for the intended purpose, it is relatively complex in its structure, and correspondingly costly to build. Furthermore, it requires more space than is available in some friction clutches.

It is a primary object of this invention to provide an improved clutch disc assembly which duplicates the performance characteristics of the known device including its high reliability in operation, yet requires less space and can be built at lower cost.

With these and other objects in view, the invention resides in an improvement in the known driven clutch member which has a principal hub, a secondary hub coaxially rotatable on the principal hub, and cooperating abutments on the two hubs which limit their relative angular movement. A disc element which carries friction facings is rotatably mounted on the secondary hub member. A first vibration absorbing element is operatively interposed between the secondary hub and the disc element and resiliently resists relative angular displacement of the secondary hub and of the disc element with a force which increases quite rapidly with the magnitude of the displacement.

This invention is concerned more specifically with improvements in a second vibration absorbing element which is operatively interposed between the two hubs and resists their relative angular displacement with a force which increases relatively slowly with the magnitude of the last-mentioned displacement. The second vibration absorbing element includes a central annular disc secured on the principal hub against angular displacement about the clutch axis, two lateral discs axially offset from the central disc in opposite axial directions and rotatable relative to the principal hub. The two lateral discs are flat rings and thus have inner and outer peripheries respectively adjacent and remote from the clutch axis.

Circumferentially elongated openings in the lateral and central discs simultaneously receive relatively soft helical springs in such a manner that the springs resiliently resist movement of the central disc relative to the lateral discs. Respective portions of the outer peripheries of the latter are secured to the secondary hub against rotation about the clutch axis relative to the secondary hub.

The exact nature of this invention as well as other objects and advantages thereof will be readily apparent from consideration of the following specification relating to the annexed drawing in which.

Figure 1:
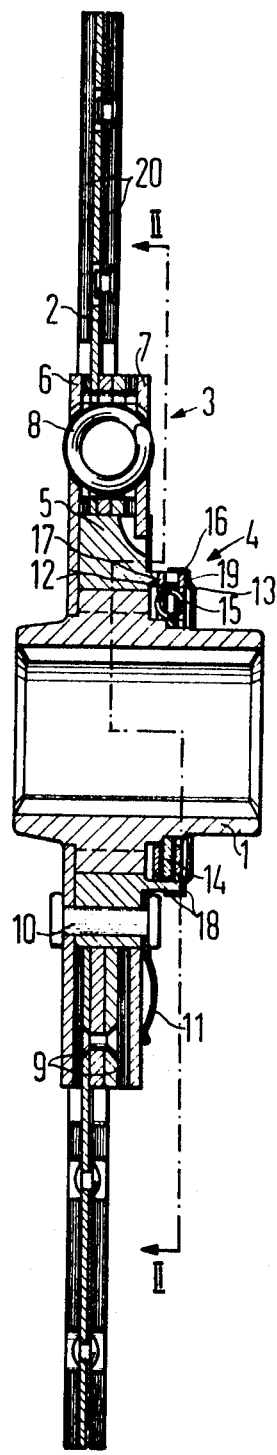
FIG. 1 shows a clutch disc assembly of the invention in section on its axis.
Figure 2:
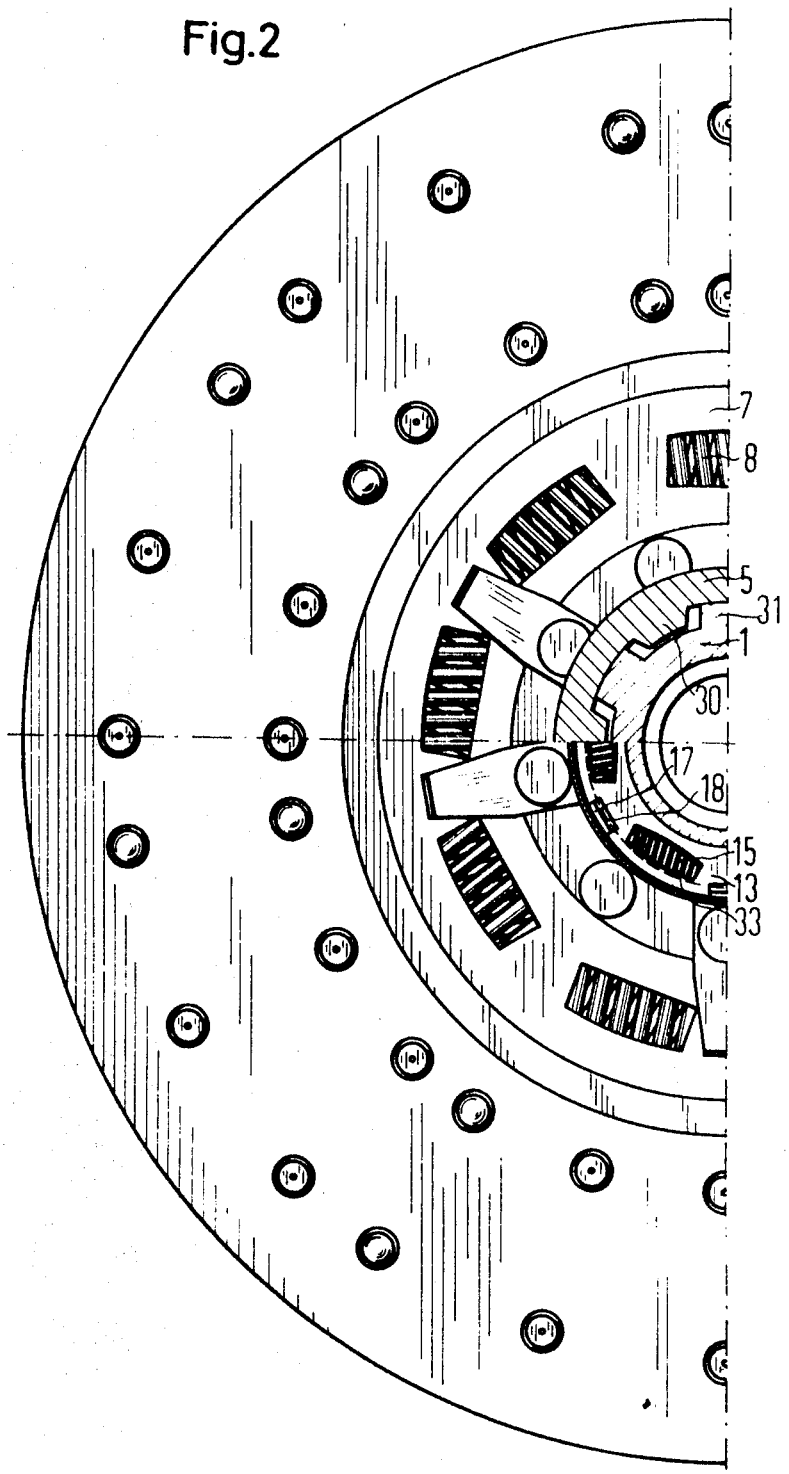
FIG. 2 shows one half of the assembly of FIG. 1 in an axial view and partly in section on the line II–II.

Referring initially to FIGS. 1 and 2, there is seen a clutch disc assembly which constitutes the driven clutch member in an otherwise conventional friction clutch for a motor car or a motorcycle. The principal hub 1 of the disc assembly is a tube internally threaded for engagement with a clutch shaft and coaxially carries a disc element 2 provided with friction facings 20. The transmission of shocks and of vibration between the disc element 2 and the principal hub 1 is impeded by two vibration absorbing elements 3,4, the element 3 having rather stiff spring characteristics, and the element 4 having soft spring characteristics.

A secondary hub 5 is coaxially mounted on the principal hub 1 for rotation about the common clutch axis, but such rotation is limited to a small angle by ribs 30 on the inner bearing face of the hub 5 which engage recesses circumferentially separating ribs 31 on the outer face of the hub 1, the ribs 30,31 tapering circumferentially away from the associated hub faces and being axially elongated.

The first vibration absorbing element 3 includes a flat annular plate 6 fixedly attached to the secondary hub 5 by bolts 10 which pass axially through the hub 5 and also carry leaf springs 11 which axially abut against a flat, annular plate 7 loosely movable on the hub 5, and compress the stack of flat disc or plate members including the plates 6,7, the disc element 2, and interposed discs 9 of friction facing material. Axially aligned recesses in the elements of the stack are circumferentially elongated along a common circle about the clutch axis and receive helical compression springs 8. The springs cooperate with the friction discs 9 to impede relative angular displacement of the disc element 2 and of the hub 5.

The structure described so far is known, and is common to both illustrated embodiments of the instant invention.

The second vibration absorbing element 4 shown in FIGS. 1 and 2 includes a stack of three axially juxtaposed, coaxial, flat, annular discs 12,13,14. The central disc 14 is fixedly fastened to the principal hub 1 and thereby secured against movement about the clutch axis relative to the hub 1. It projects radially outward from the hub 1 far enough to be radially coextensive in part with the secondary hub 5 to which it is axially juxtaposed. Of the two lateral discs 12,13, the disc 12 is arranged axially between the disc 14 and the secondary hub 5, whereas the disc 13 is offset axially from the central disc 14 in a direction away from the hub 5. The lateral discs 12,13 envelop the hub 1 with ample clearance.

The disc stack of the second vibration absorbing element 4 has circumferentially elongated openings 33 which receive relatively weak helical compression springs 15. Straight axial projections 17 are circumferentially distributed over the hub 5 and extend from the latter into aligned notches 18 in the outer peripheries of the discs 12,13, the diameter of the disc 14 being small enough to clear the projections 17 in all operative positions of the apparatus. The lateral discs 12,13 thus must move with the secondary hub 5 about the clutch axis while capable of slight axial movement. This movement is impeded by a spring metal cover 19 having the shape of a shallow cup with centrally apertured circular bottom and a narrow cylindrical wall 16 parallel to the clutch axis. The wall 16 envelops the disc 13 and is fixedly attached to the projections 17 by a close friction fit or by soldering.

Rotation of the central disc 14 between the lateral discs 12,13 is thus impeded by friction within the stack, by the cover 19, and by the springs 15 which resist the relative angular displacement of the discs 12,13 and 14 with a force which increases much more slowly with the magnitude of the displacement than the springs 8. The displacement is limited by abutting engagement of the ribs 30,31 on the hubs 1,5.

Figure 3:
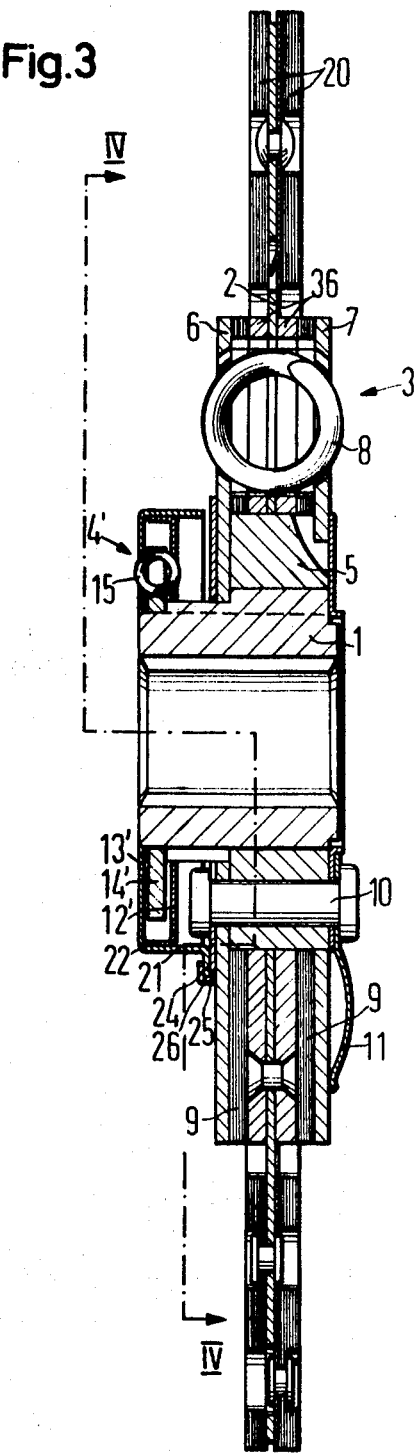
FIG. 3 illustrates a modified assembly in a view corresponding to that of FIG. 1.
Figure 4:
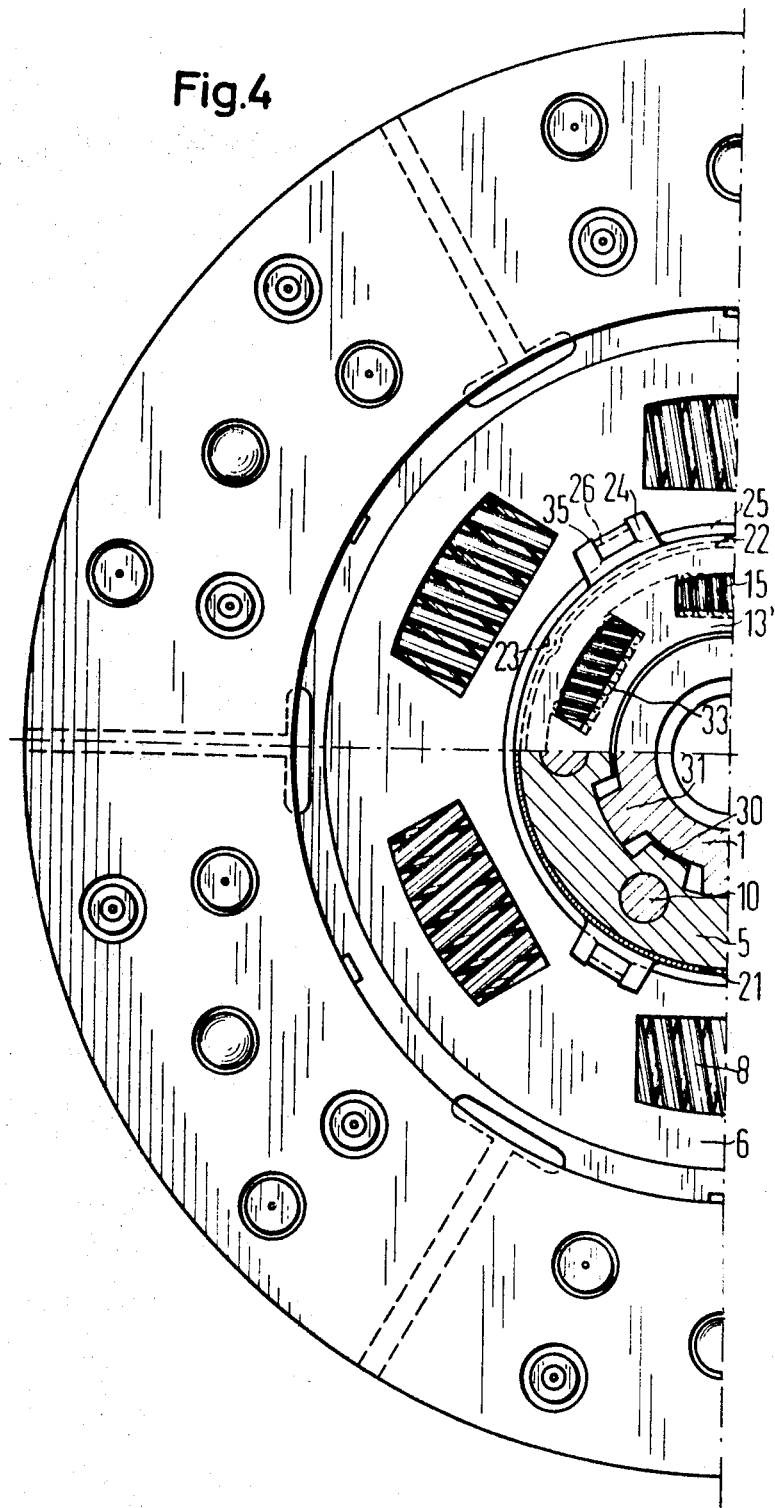
FIG. 4 shows one half of the assembly of FIG. 3 in an axial view and partly in section on the line IV–IV.

The second vibration absorbing element 4' in the modified clutch disc assembly of FIGS. 3 and 4 has a central disc 14' analogous to the afore-described disc 14. It is fixed on the hub 1 and flanked by lateral discs 13'. A cylindrical shell 21 is integrally fastened to the outer periphery of the disc 13' so as to form therewith a unitary, substantially cup-shaped member open toward the secondary hub 5 and receiving the discs 14',12' therein. The other lateral disc 12' has a narrow cylindrical flange 22 projecting axially from its outer periphery in an axial direction away from the hub 5 and so dimensioned as to engage the shell 21 from the inside with a firm friction fit which fixedly connects the discs 12',13' under all normal operating conditions. The flange 22 and the shell 21 are further fastened to each other by interengaged radial projections and dimples 23 formed by means of a staking tool.

The free edge of the shell 21 is fastened to the hub 5 by means of forked lugs 24 radially projecting from the shell and lugs 26 on the outer periphery of a flat annular disc 25 attached to the hub 5 by means of the bolts 10. The lugs 26 are received in the recesses of the forked lugs 24 on the shell 21 and crimped into a U-shape best seen in FIG. 4 to lock the discs 12',13' to the hub 5. Torque is transmitted from the disc element 2 to the primary hub 1 during idling of the associated internal combustion engine by the springs 15 which are bypassed by the engaged ribs 30,31 when a more substantial load has to be overcome by the engine. The springs 8 then absorb shock and vibrations until they are fully compressed by relative angular movement of the plate 6 and the disc element 2, as more fully discussed in the afore-mentioned earlier patent.

The most favorable vibration absorbing properties are achieved in the illustrated clutch disc assemblies if the ribs 30,31 permit the discs of the second vibration absorbing element 4,4' to move 9° in either direction relative to each other from a neutral position, and if the spring constant of the second element is not more that 0.5 kilogrammeter per degree. The spring constant of the first vibration absorbing element 3,3' should be 1.5 to 10 kilogrammeter per degree for use in motorcars and 10 to 70 kilogrammeter per degree for use in trucks.

While accomplishing the same desirable results as the clutch disc assemblies of the earlier patent, the assemblies of the instant invention occupy much less space, particularly near the clutch axis, than earlier disc assemblies of the same capacity, and they can be constructed at a significantly lower cost without loss in performance or reliability.

We claim:
1. A driven member for a friction clutch comprising, in combination:
   a. a principal hub member 1 having an axis;
   b. a secondary hub member 5 mounted on said principal hub member 1 for rotation about said axis;
   c. cooperating abutment means 30,31 on said hub members for limiting relative angular movement of the same;
   d. a disc element 2 carrying friction facings 20 rotatably mounted on said secondary hub member 5;
   e. first vibration absorbing means 3 operatively interposed between said secondary hub member 5 and said disc element 2 for resiliently resisting relative angular displacement of said secondary hub member and of said disc element with a force increasing relatively rapidly with the magnitude of said displacement;
   f. second vibration absorbing means 4 operatively interposed between said secondary hub member 5 and said principal hub member 1 for resiliently resisting relative angular displacement of said hub members relative to each other with a force increasing relatively slowly with the magnitude of said last-mentioned displacement, said second vibration absorbing means including:
   1. a central disc member 14 secured on said principal hub member 1 against angular displacement about said axis;
   2. two lateral disc members 12,13 axially offset from said central disc member 14 in opposite axial directions and rotatable relative to said principal hub member 1, each lateral disc member having an inner periphery adjacent said axis and an outer periphery remote from said axis;
   3. a plurality of helical springs 15, said disc members 12,13,14 being formed with respective circumferentially elongated openings 33, each spring 15 being simultaneously received in respective openings of said disc members for resiliently resisting movement of said central disc member relative to said lateral disc members; and
   g. securing means 17,21 on said secondary hub member 5 engaging respective portions of the outer peripheries of said lateral disc members 12,13 for securing the same to said secondary hub member against rotation about said axis relative to said secondary hub member.

2. A driven member as set forth in claim 1, wherein said disc members 12,13,14 are axially juxtaposed to said secondary hub member 5, and at least partly coextensive therewith in a radial direction.

3. A driven member as set forth in claim 2, wherein said securing means include a plurality of axial projections 17 on said secondary hub member 5, and the outer peripheries of said lateral disc members 12,13 are formed with notches 18 receiving said projections.

4. A driven member as set forth in claim 3, further comprising a cup-shaped resilient cover 19 having a bottom portion axially offset from the disc members 12,13,14 in a direction away from said secondary hub member 5, and an annular axial wall portion 16 enveloping one of said lateral disc members 13 and fixedly fastened to said projections 17.

5. A driven member as set forth in claim 2, wherein said securing means include a cylindrical shell 21 centered in said axis, said shell extending axially from said secondary hub member 5 and being fastened to said hub member and to said outer peripheries of said lateral disc members 12',13'.

6. A driven member as set forth in claim 5, wherein said shell 21 and one of said lateral disc members 13' are integral portions of a unitary, substantially cup-shaped member, said one lateral disc member being farther from said secondary hub member 5 than the other lateral disc member 12'.

7. A driven member as set forth in claim 6, wherein said other lateral disc member 12' has an annular flange 22 fixedly fastened to said shell 21 within said unitary, cup-shaped member.

8. A driven member as set forth in claim 7, said shell 21 and said flange 22 being formed with respective, interengaged, radial projections and recesses 23 for fixedly fastening the flange to said shell.

9. A driven member as set forth in claim 5, wherein said securing means further include lugs 24 radially projecting from said shell 21, and locking means 25 on said secondary hub member 5 engaging said lugs.

10. A driven member as set forth in claim 9, wherein said locking means include a flat disc 25 attached to said secondary hub member 5, and radial lugs 26 on the outer periphery of said flat disc 25 engaging respective recesses in the lugs 24 of said shell 21.